US012031514B2

(12) United States Patent
Sim et al.

(10) Patent No.: US 12,031,514 B2
(45) Date of Patent: Jul. 9, 2024

(54) IGNITION APPARATUS AND CONTROL METHOD THEREOF

(71) Applicants: Hyundai Motor Company, Seoul (KR); Kia Corporation, Seoul (KR)

(72) Inventors: Kiseon Sim, Suwon-si (KR); Soo Hyung Woo, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 18/332,423

(22) Filed: Jun. 9, 2023

(65) Prior Publication Data

US 2024/0167446 A1 May 23, 2024

(30) Foreign Application Priority Data

Nov. 22, 2022 (KR) ........................ 10-2022-0157100

(51) Int. Cl.
*F02P 3/05* (2006.01)

(52) U.S. Cl.
CPC .................................... *F02P 3/053* (2013.01)

(58) Field of Classification Search
CPC ........................................................ F02P 3/053
See application file for complete search history.

(56) References Cited

U.S. PATENT DOCUMENTS 11,346,317 B1 * 5/2022 Wagh ...................... F02P 9/002
11,795,899 B1 * 10/2023 Sim ......................... F02P 3/045
2009/0114188 A1 * 5/2009 Peters ................... F02D 41/064 123/406.19
2012/0197471 A1 * 8/2012 Irisawa .................. B60K 6/445 180/65.265
2014/0163789 A1 * 6/2014 Yu ......................... B60W 20/00 903/930

* cited by examiner

*Primary Examiner* — Kevin A Lathers
(74) *Attorney, Agent, or Firm* — Fish & Richardson P.C.

(57) ABSTRACT

An ignition apparatus of an engine includes a spark plug disposed in a combustion chamber, and configured to generate a spark discharge between a center electrode and a ground electrode, a plurality of ignition coils each applying a current to the spark plug and including a primary coil, a secondary coil, a main switch, and an auxiliary switch, and a controller selectively performing a multi-stage ignition through a first ignition coil and a second ignition coil or a single-stage ignition through one ignition coil among the first ignition coil and the second ignition coil, adjusting a charging speed, a number of discharges, and a discharge maintaining period of the ignition coil depending on a driving point of the engine, and adjusting the charging speed of the ignition coil and a target air/fuel ratio for performing a lean combustion, based on a state of charge of a battery.

14 Claims, 15 Drawing Sheets

IGNITION APPARATUS AND CONTROL METHOD THEREOF

CROSS-REFERENCE TO RELATED APPLICATION

This application claims priority to and the benefit of Korean Patent Application No. 10-2022-0157100 filed in the Korean Intellectual Property Office on Nov. 22, 2022, the entire contents of which are incorporated herein by reference.

TECHNICAL FIELD

The present disclosure relates to an ignition apparatus and a control method thereof. More particularly, the present disclosure relates to an ignition apparatus of a vehicle and a control method thereof capable of performing multi-stage ignition.

BACKGROUND

In gasoline vehicles, a mixture of air and fuel is ignited by a spark generated by a spark plug to be combusted. For example, the air-fuel mixture injected into a combustion chamber during a compression stroke is ignited by a discharge phenomenon of the spark plug, and thus energy required for operating the vehicle is generated while undergoing a high temperature and high pressure expansion process.

The spark plug provided in the gasoline vehicle serves to ignite a compressed air-fuel mixture by spark discharge caused by a high voltage current generated by an ignition coil.

In a conventional spark plug, spark discharge is generated between a pair of electrodes (a center electrode and a ground electrode) by a high voltage current induced from an ignition coil, and an air-fuel mixture introduced into a combustion chamber is ignited.

In a case of introducing lean-burn combustion or recirculated exhaust gas into an engine, since the ignition energy supplied into the combustion chamber should be increased, multi-stage ignition in which the spark plug is ignited multiple times during the explosion stroke is used.

However, when the ignition energy supplied into the combustion chamber is increased through the multi-stage ignition, severe heat generation may occur in the ignition coil.

SUMMARY

The present disclosure attempts to provide an ignition apparatus capable of controlling heat generated by an ignition coil and preventing deterioration of the ignition coil, by performing multi-stage ignition.

An ignition apparatus of an engine includes a spark plug disposed in a combustion chamber, and configured to generate a spark discharge between a center electrode and a ground electrode, two ignition coils each of which may be configured to apply a current to the spark plug, and may include a primary coil, a secondary coil, a main switch selectively passing current to the primary coil, and an auxiliary switch connected in parallel to the primary coil, and a controller configured to selectively perform a multi-stage ignition through a first ignition coil and a second ignition coil, or a single-stage ignition through one ignition coil among the first ignition coil and the second ignition coil, depending on an operation region of the engine, adjust a charging speed, a number of discharges, and a discharge maintaining period of the ignition coil depending on a driving point of the engine, and adjust the charging speed of the ignition coil and a target air/fuel ratio for performing a lean combustion, based on a state of charge (SOC) of a battery.

Each of the ignition coils may include a first circuit in which the battery, the primary coil, and the main switch selectively form a closed circuit, a second circuit in which the secondary coil, the center electrode, and the ground electrode selectively form a closed circuit, and a third circuit in which the primary coil, and the auxiliary circuit selectively form a closed circuit.

A plurality of modes are selectively performed, where the plurality of modes may include a first mode in which the first circuit forms a closed circuit by an operation of the main switch and the auxiliary switch to charge the primary coil, a second mode in which the first circuit and the second circuit form a closed circuit by the operation of the main switch and the auxiliary switch to charge the primary coil, a third mode in which the third circuit forms an open circuit by the operation of the main switch and the auxiliary switch to discharge the secondary coil, and a fourth mode in which the discharge of the secondary coil is temporarily stopped by the operation of the main switch and the auxiliary switch while discharging the secondary coil.

In an operation region performing lean combustion, the controller may perform the multi-stage ignition, and in an operation region other than the operation region performing lean combustion, the controller may perform the single-stage ignition.

In the operation region performing lean combustion, when the driving point of the engine moves from a low-speed to a high-speed, the controller may increase an initial discharge current, and decreases the discharge maintaining period and the number of discharges.

In the operation region performing lean combustion, when the driving point of the engine moves from low-load to high-load, the controller may increase the charging speed of the ignition coil.

In the operation region performing lean combustion, when the state of charge (SOC) of the battery is above a voltage compensation point, the controller may increase the charging speed of the ignition coil as the SOC increase.

When the SOC of the battery is below the voltage compensation point, the controller decreases the target air/fuel ratio for performing lean combustion.

A control method of an ignition apparatus includes determining, by a controller, an operation region of an engine, by the controller, selectively performing a single-stage ignition by one of two ignition coils, or a multi-stage ignition by the two ignition coils, depending on the operation region of the engine, by the controller, according to a driving point of the engine, controlling a charging speed number of discharges and a discharge maintaining period of the ignition coil, and by the controller, according to a state of charge (SOC) of a battery, controlling the charging speed and a target air/fuel ratio of the ignition coil.

When the operation region of the engine is an operation region performing lean combustion, by the controller, the multi-stage ignition may be performed, and when the operation region of the engine is an operation region other than the operation region performing lean combustion, by the controller, the single-stage ignition may be performed.

In the operation region performing lean combustion, when the driving point of the engine moves from a low-load to a high-load, by the controller, the charging speed of the ignition coil may be increased.

In the operation region performing lean combustion, when the driving point of the engine moves from a low-speed to a high-speed, by the controller, an initial discharge current of the ignition coil may be increased, and the discharge maintaining period and the number of discharges may be decreased.

In the operation region performing lean combustion, when the SOC of the battery is above a voltage compensation point, by the controller, the charging speed of the ignition coil may be increased as the SOC increases.

In the operation region performing lean combustion, when the SOC of the battery is below the voltage compensation point, by the controller, the target air/fuel ratio for performing lean combustion may be decreased.

According to an ignition apparatus according to an embodiment, a single-stage ignition or a multi-stage ignition is selectively performed depending on the operation region of the engine, and thereby ignitability of the engine is enhanced while preventing the unnecessary power consumption.

In addition, the charging speed of the ignition coil may be adjusted according to the driving point of the engine.

In addition, when the SOC of the battery is above the voltage compensation point, the charging speed of the ignition coil is decreased, and thereby the ignition coil may be charged at a uniform speed regardless of according to the voltage supplied from the battery.

DETAILED DESCRIPTION

First, an example of an engine system to which an ignition coil system is applied is described in detail with reference to the drawings.

Figure 1:
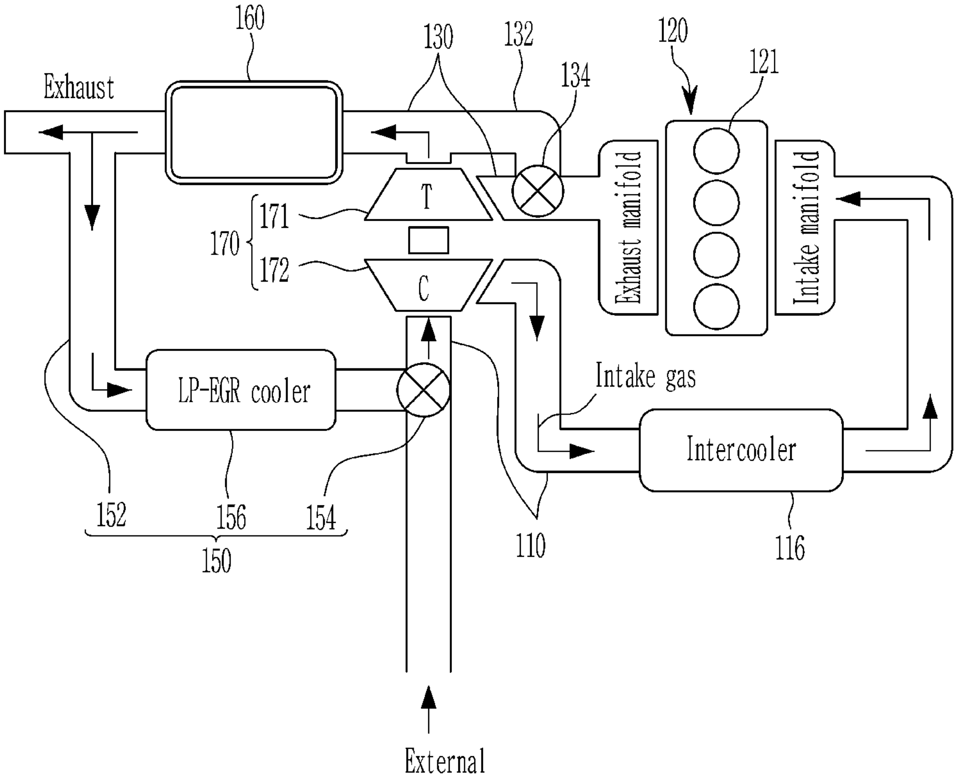
FIG. 1 is a diagram illustrating an example of an engine system including an ignition apparatus.

FIG. 1 is a schematic view illustrating a configuration of an engine system.

As shown in FIG. 1, the engine system to which an ignition apparatus is applied may include the engine 120 including a plurality of cylinders 121 generating a driving torque required for driving the vehicle through fuel combustion, an intake line 110 through which fresh air (or, ambient air) supplied to a cylinder 121 flows, an exhaust line 130 through which an exhaust gas exhausted from the cylinder 121 flows, a turbocharger 170 compressing the exhaust gas (hereinafter, also called a recirculation gas) recirculated to be mixed with the fresh air supplied to the cylinder 121, and an exhaust gas recirculation (EGR) apparatus 150 for recirculating the exhaust gas exhausted from the cylinder 121 to the cylinder.

A catalytic converter 160 for purifying various materials included in the exhaust gas exhausted from the cylinder 121 is provided on the exhaust line 130.

A turbocharger 170 may include a turbine 171 provided on the exhaust line 130 and configured to rotate by the exhaust gas exhausted from the cylinder 121, and a compressor 172 provided on an intake line 110 and configured to compressing the fresh air and the recirculation gas by rotating with the turbine 171.

The exhaust gas recirculation apparatus 150 may include an EGR line 152 branching from the exhaust line 130 and joining the intake line 110, an EGR cooler 156 installed on the EGR line 152, and an EGR valve 151 installed on the EGR line 152. The EGR cooler 156 cools the exhaust gas of a high temperature recirculating through the EGR line 152. An amount of the recirculation gas recirculating the EGR line 152 is adjusted by an opening of an EGR valve 154.

An intercooler 116 is installed on the intake line 110 at a downstream side of the compressor 172, and an air-fuel mixture (the ambient air and the recirculation gas) of a high temperature and high pressure compressed by the compressor 172 of the turbocharger 170 is cooled by the intercooler 116.

A spark plug 1 for igniting the air-fuel mixture of the fuel and the air is mounted on the cylinder 121 of the engine.

Figure 2:
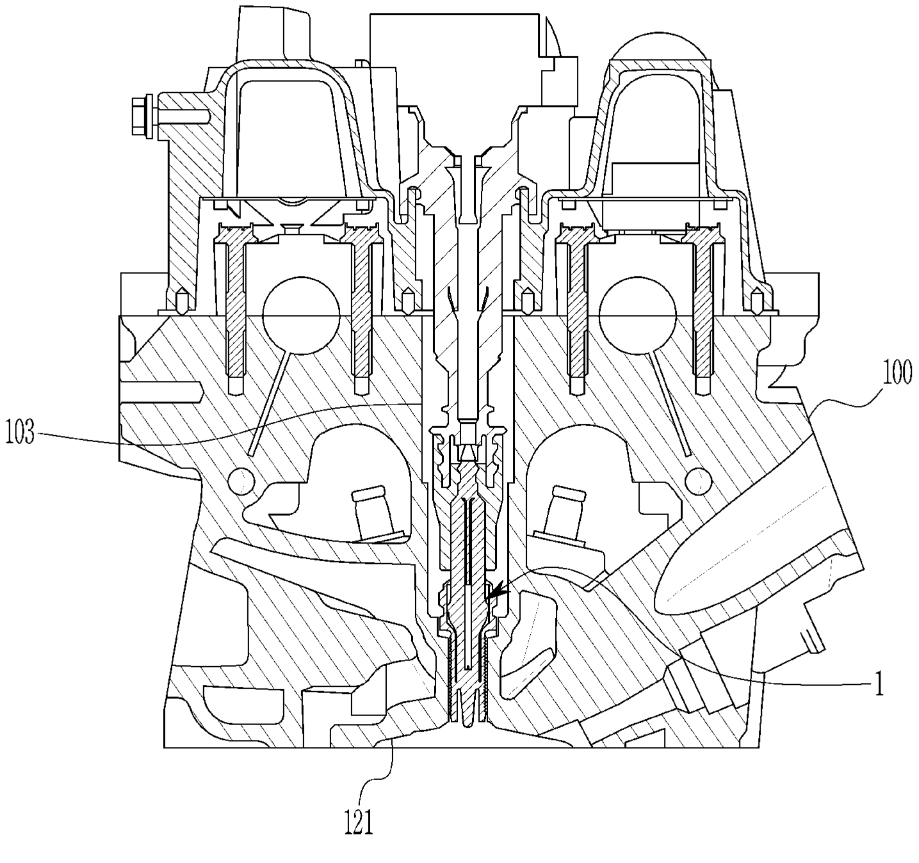
FIG. 2 is a diagram illustrating a cross-sectional view of an example of an engine in which a spark plug is mounted.

FIG. 2 illustrates a cross-sectional view of an engine in which a spark plug is mounted.

As shown in FIG. 2, a spark plug 1 is mounted on a cylinder (or, a combustion chamber) of an engine, and generates spark discharge.

The engine to which the spark plug 1 is applied includes a cylinder block and a cylinder head 100, and the cylinder block and the cylinder head 100 are combined to form a combustion chamber 101 therein. An air-fuel mixture inflowing into the combustion chamber 101 is ignited by spark discharge generated by the spark plug 1.

In the cylinder head 100, a mount hole 103 in which the spark plug 1 is mounted is formed long in a vertical direction. A lower portion of the spark plug 1 that is mounted in the mount hole 103 protrudes into the combustion chamber 101. A center electrode 2 and a ground electrode 3 that are electrically connected to an ignition coil are formed at the lower portion of the spark plug 1, and the spark discharge is generated between the center electrode 2 and the ground electrode 3.

Figure 3:
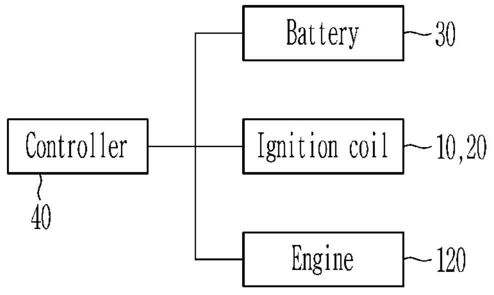
FIG. 3 is a block diagram illustrating an example of an ignition apparatus.

FIG. 3 is a block diagram showing a configuration of an ignition apparatus.

As shown in FIG. 3, an ignition apparatus may include a battery, an ignition coil system, and controller.

The ignition coil system is configured to supply a discharge current to the spark plug 1 mounted on a cylinder 121, and may include two ignition coils 10 and 20. Details of the ignition coil system is described later.

A battery 30 supplies electrical power required for driving of the vehicle to respective electrical components and the ignition coils 10 and 20, and a state of charge (SOC) of the battery 30 is transmitted to a controller.

A controller 40 may selectively perform a single-stage ignition or a multi-stage ignition based on an operation region of the engine, control the number of discharges and a discharge maintaining period based on a driving point of the engine, a charging speed, and control the charging speed and a target air/fuel ratio based on the SOC.

To this end, the ignition controller 40 may be provided as at least one processor executed by a predetermined program, and the predetermined program is configured to perform respective steps of a control method of the ignition apparatus according to an embodiment of the present disclosure.

Figure 4:
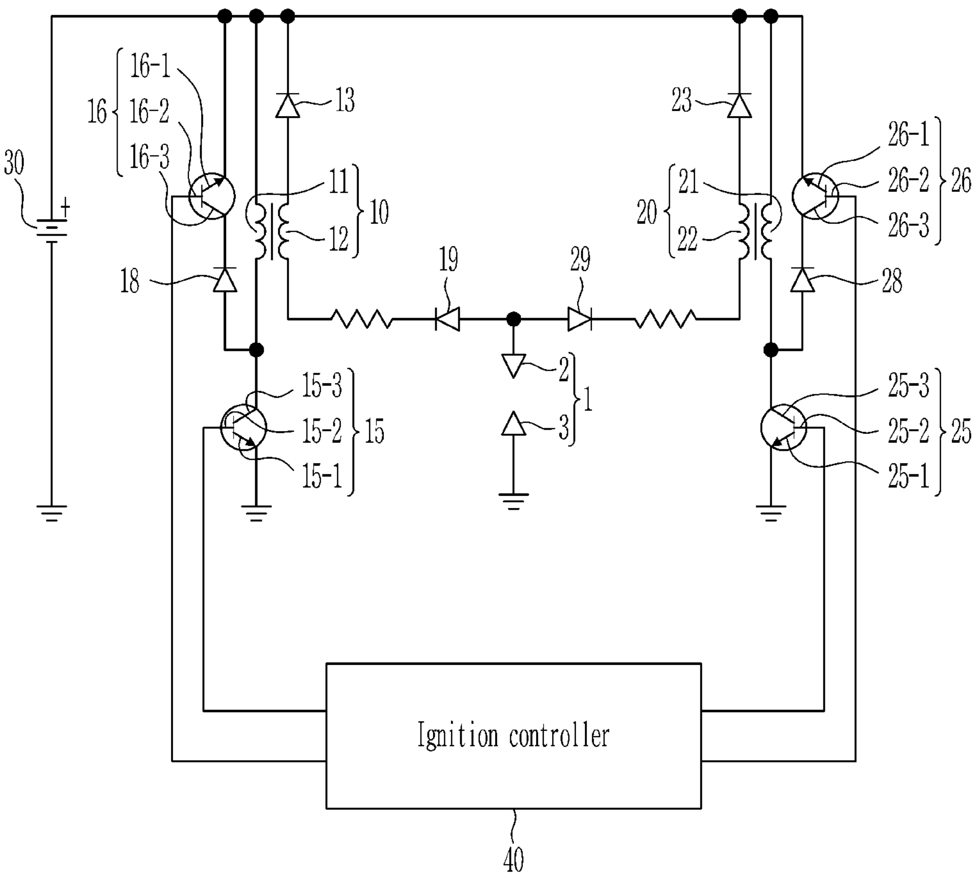
FIG. 4 is a diagram illustrating an example of an ignition coil system of an ignition system.

FIG. 4 illustrates a schematic view of an ignition coil system.

As shown in FIG. 4, an ignition coil system may include at least one ignition coil, and a controller for controlling an operation of the ignition coil. In some implementations, an ignition coil system including two ignition coils (a first ignition coil 10 and a second ignition coil 20) will be described, but the scope of the present disclosure is not limited thereto. An appropriate number of ignition coils may be provided according to the needs of the designer.

The first ignition coil 10 includes a primary coil 11 and a secondary coil 12, a first end of the primary coil 11 is electrically connected to a battery 30 of a vehicle, and the other end of the primary coil 11 is grounded through a first main switch 15. According to an on/off operation of the first main switch 15, the primary coil 11 of the first ignition coil 10 may selectively receive electrical current.

The first main switch 15 may be realized with a transistor switch (for example, an insulated gate bipolar transistor (IGBT)) including an emitter terminal 15-1, a collector terminal 15-3, and a base terminal 15-2. That is, the other end of the primary coil 11 may be electrically connected to the collector terminal 15-3 of the first main switch 15, the emitter terminal 15-1 thereof may be grounded, and the base terminal 15-2 thereof may be electrically connected to a controller 40.

The battery 30, the primary coil 11, and the first main switch 15 are connected in series, and they selectively form a closed circuit according to an operation of the first main switch 15. In the specification of the present disclosure, an electric circuit formed by the battery, the primary coil 11, and the first main switch 15 that are connected in series is referred to as a first circuit.

When the first circuit forms a closed circuit, a current is supplied from the battery 30 to the primary coil 11, and electrical energy is charged in the primary coil 11.

One end of the secondary coil 12 is electrically connected to a center electrode 2, and the other end thereof is electrically connected to the battery 30. A diode 13 is installed between the secondary coil 12 and the battery 30 to block a current from flowing from the secondary coil 12 to the battery 30. In addition, a diode 19 is installed between the secondary coil 12 and the center electrode 2, so that a current flows only from the secondary coil 12 to the center electrode 2.

The battery 30, the secondary coil 12, the center electrode 2, and a ground electrode 3 are connected in series, and a high voltage current (or induced electromotive force) is selectively generated in the secondary coil 12 according to the operation of the primary coil 11. In the specification of the present disclosure, an electric circuit formed by the battery 30, the secondary coil 12, the center electrode 2, and the ground electrode 3 that are connected in series is referred to as a second circuit.

When the first circuit forms an open circuit by the first main switch 15, the primary coil 11 is discharged and a high voltage current is generated in the secondary coil 12 by electromagnetic induction. Accordingly, a current flows in the second circuit, and a high voltage current is supplied between the center electrode 2 and the ground electrode 3 to generate a spark discharge. That is, a current selectively flows in the second circuit by the operation of the first main switch 15.

Meanwhile, a first auxiliary switch 16 is connected in parallel to both ends of the primary coil 11 of the first ignition coil 10. The primary coil 11 and the first auxiliary switch 16 selectively form a closed circuit. In the specification of the present disclosure, an electric circuit formed by the primary coil 11 and the first auxiliary switch 16 is referred to as a third circuit.

The first auxiliary switch 16 may be realized with a transistor switch (for example, an insulated gate bipolar transistor (IGBT)) including an emitter terminal 16-1, a collector terminal 16-3, and a base terminal 16-2. In this case, the emitter terminal 16-1 of the first auxiliary switch 16 is electrically connected between the primary coil 11 and the first main switch 15, and the base terminal 16-2 thereof is electrically connected to the controller 40, and the collector terminal 16-3 thereof is electrically connected to the battery 30.

When the controller 40 applies a control signal to the base terminal 15-2 of the first main switch 15, the primary coil 11 of the first ignition coil 10 receives electrical current (the first circuit forms a closed circuit), and the primary coil 11 is charged with electrical energy.

When the controller 40 does not apply a control signal to the base terminal 15-2 of the first main switch 15, a high voltage current (or discharge current) is generated in the secondary coil 12 due to electromagnetic induction of the primary coil 11 and the secondary coil 12. The discharge current generated in the secondary coil 12 flows to the center electrode 2, and while spark discharge being generated between the center electrode 2 and the ground electrode 3 by the discharge current generated in the secondary coil 12, an air-fuel mixture inside the combustion chamber 101 is ignited.

That is, when a control signal is applied to the first main switch 15, the first circuit forms a closed circuit, and the primary coil 11 is charged by a current outputted from the battery. In addition, when no control signal is applied to the first main switch 15, the first circuit forms an open circuit, and while a high voltage current induced in the secondary coil 12 is applied to the center electrode 2 along the second circuit, a spark discharge is generated between the center electrode 2 and the ground electrode 3.

When a control signal is applied to the base terminal of the auxiliary switch while the first circuit forms a closed circuit, the third circuit forms a closed circuit. In this case, when the third circuit forms the closed circuit, the primary coil 11 electrically connected to the battery 30 is no longer charged, and the electrical energy already charged in the primary coil 11 while flowing along the third circuit remains stored.

While the first circuit forms an open circuit (in other words, while the secondary coil is discharged), when a control signal is applied to the base terminal of the auxiliary switch, the third circuit forms a closed circuit. In this case, when the third circuit forms a closed circuit, the electrical energy charged in the primary coil 11 flows along the third circuit, and the voltage applied to the secondary coil 12 is considerably reduced. Accordingly, the discharge in the secondary coil 12 is temporarily stopped.

Like the first ignition coil 10, the second ignition coil 20 includes a primary coil 21 and a secondary coil 22, a first end of the primary coil 21 is electrically connected to the battery 30 of the vehicle, and the other end of the primary coil 21 is grounded through a second main switch 25. According to an on/off operation of the second main switch 25, the primary coil 21 of the second ignition coil 20 may selectively receive electrical current.

The second main switch 25 may be realized with a transistor switch (for example, an insulated gate bipolar transistor (IGBT)) including an emitter terminal 25-1, a collector terminal 25-3, and a base terminal 25-2. That is, the other end of the primary coil 21 may be electrically connected to the collector terminal 25-3 of the second main switch 25, the emitter terminal 25-1 thereof may be grounded, and the base terminal 25-2 thereof may be electrically connected to the controller 40.

The battery 30, the primary coil 21, and the second main switch 25 are connected in series, and they selectively form a closed circuit according to an operation of the second main switch 25. In the specification of the present disclosure, an electric circuit formed by the battery 30, the primary coil 21, and the second main switch 25 that are connected in series is referred to as a first circuit.

When the first circuit forms a closed circuit, a current is supplied from the battery 30 to the primary coil 21 of the second ignition coil 20, and electrical energy is charged in the primary coil 21.

One end of the secondary coil 22 is electrically connected to a center electrode 2, and the other end thereof is electrically connected to the battery 30. A diode 23 is installed between the secondary coil 22 and the battery 30 to block a current from flowing from the secondary coil 22 to the battery 30. In addition, a diode 29 is installed between the secondary coil 22 and the center electrode 2, so that a current flows only from the secondary coil 22 to the center electrode 2.

The battery 30, the secondary coil 22, the center electrode 2, and the ground electrode 3 are connected in series, and a high voltage current (or induced electromotive force) is selectively generated in the secondary coil 22 according to the operation of the primary coil 21. In the specification of the present disclosure, an electric circuit formed by the battery 30, the secondary coil 22, the center electrode 2, and the ground electrode 3 that are connected in series is referred to as a second circuit.

When the first circuit forms an open circuit by the second main switch 25, the primary coil 21 is discharged and a high voltage current is generated in the secondary coil 22 by electromagnetic induction. Accordingly, a current flows in the second circuit, and a high voltage current is supplied between the center electrode 2 and the ground electrode 3 to generate a spark discharge. That is, a current selectively flows in the second circuit by the operation of the second main switch 25.

On the other hand, a second auxiliary switch 26 is connected in parallel to both ends of the primary coil 21. The primary coil 21 and the second auxiliary switch 26 selectively form a closed circuit. In the specification of the present disclosure, an electric circuit formed by the primary coil 21 and the second auxiliary switch 26 is referred to as a third circuit.

The second auxiliary switch 26 may be realized with a transistor switch (for example, an insulated gate bipolar transistor (IGBT)) including an emitter terminal 26-1, a collector terminal 26-3, and a base terminal 26-2. In this case, the emitter terminal 26-1 of the second auxiliary switch 26 is electrically connected between the primary coil 21 and the second main switch 25, the base terminal 26-2 thereof is electrically connected to the controller, and the collector terminal 26-3 thereof is electrically connected to the battery.

When the controller 40 applies a control signal to the base terminal 25-2 of the second main switch 25, the primary coil 21 of the first ignition coil 20 receives electrical current (the first circuit forms a closed circuit), and the primary coil 21 is charged with electrical energy.

When the controller 40 does not apply a control signal to the base terminal 25-2 of the second main switch 25, a high voltage current (or discharge current) is generated in the secondary coil 22 due to electromagnetic induction of the primary coil 21 and the secondary coil 22. The discharge current generated in the secondary coil 22 flows to the center electrode 2, and while spark discharge being generated between the center electrode 2 and the ground electrode 3 by the discharge current generated in the secondary coil 22, an air-fuel mixture inside the combustion chamber 101 is ignited.

That is, when a control signal is applied to the second main switch 25, the first circuit forms a closed circuit, and the primary coil 21 is charged by a current outputted from the battery 30. In addition, when no control signal is applied to the second main switch 25, the first circuit forms an open circuit, and while a high voltage current induced in the secondary coil 22 is applied to the center electrode 2 along the second circuit, a spark discharge is generated between the center electrode 2 and the ground electrode 3.

While the first circuit forms the closed circuit, when the control signal is applied to the base terminal 26-2 of the second auxiliary switch 26, the third circuit forms a closed circuit. In this case, when the third circuit forms the closed circuit, the primary coil 21 electrically connected to the battery 30 is no longer charged, and the electrical energy already charged in the primary coil 21 while flowing along the third circuit remains stored.

While the first circuit forms the open circuit (in other words, while the secondary coil is discharged), when the control signal is applied to the base terminal 26-2 of the second auxiliary switch 26, the third circuit forms a closed circuit. In this case, when the third circuit forms the closed circuit, the electrical energy charged in the primary coil 21 flows along the third circuit, and the voltage applied to the secondary coil 22 is considerably reduced. Accordingly, the discharge in the secondary coil 22 is temporarily stopped.

The ignition coil system according to an embodiment of the present disclosure may be operated in four modes including a first mode to a fourth mode.

That is, the controller 40 controls the on/off of the main switches 15 and 25 and the auxiliary switches 16 and 26, so that the first to fourth modes may be selectively performed.

The first mode is a mode in which the first circuit forms a closed circuit to charge the primary coils 11 and 21, the second mode is also a mode for charging the primary coils 11 and 21, the third mode is a mode in which the third circuit forms an open circuit to discharge the secondary coils 12 and 22, and the fourth mode is a mode for temporarily stopping the discharging of the secondary coils 12 and 22 while discharging the secondary coils 12 and 22 (or while the third mode is being performed).

That is, the first mode and the second mode may be charging modes of the ignition coils 10 and 20, the third mode may be a discharging mode of the ignition coils 10 and 20, and the fourth mode may be a neutral mode for temporarily stopping the charging or discharging of the ignition coils 10 and 20.

Figure 5:
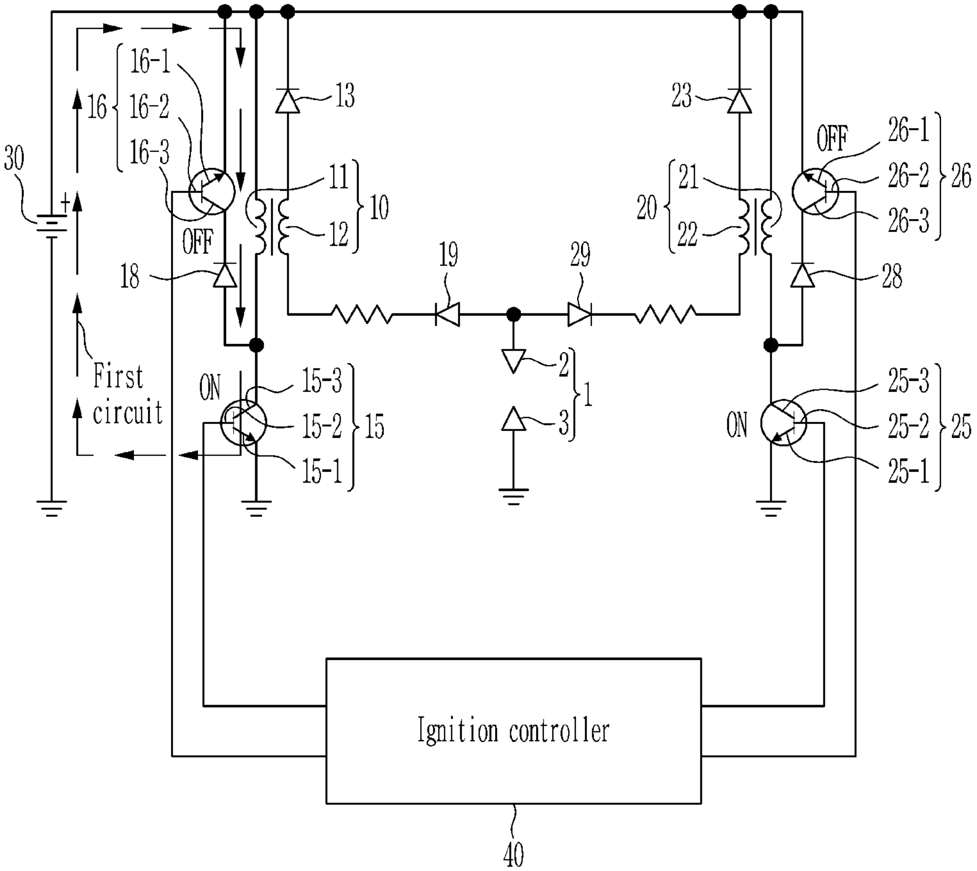
FIG. 5 to FIG. 8 are diagrams for explaining an example of an operation mode of an ignition coil system.

Referring to FIG. 5, in the first mode, the main switches 15 and 25 are turned on, while the auxiliary switches 16 and 26 are turned off by the control signal of the controller 40. Accordingly, the first circuit forms a closed circuit, and electrical energy is charged to the primary coils 11 and 12 electrically connected to the battery 30.

That is, when a control signal is applied to the main switches 15 and 25 and the auxiliary switches 16 and 26 are turned off, the first circuit forms a closed circuit, and the primary coils 11 and 21 are charged by the current outputted from the battery 30.

Figure 6:
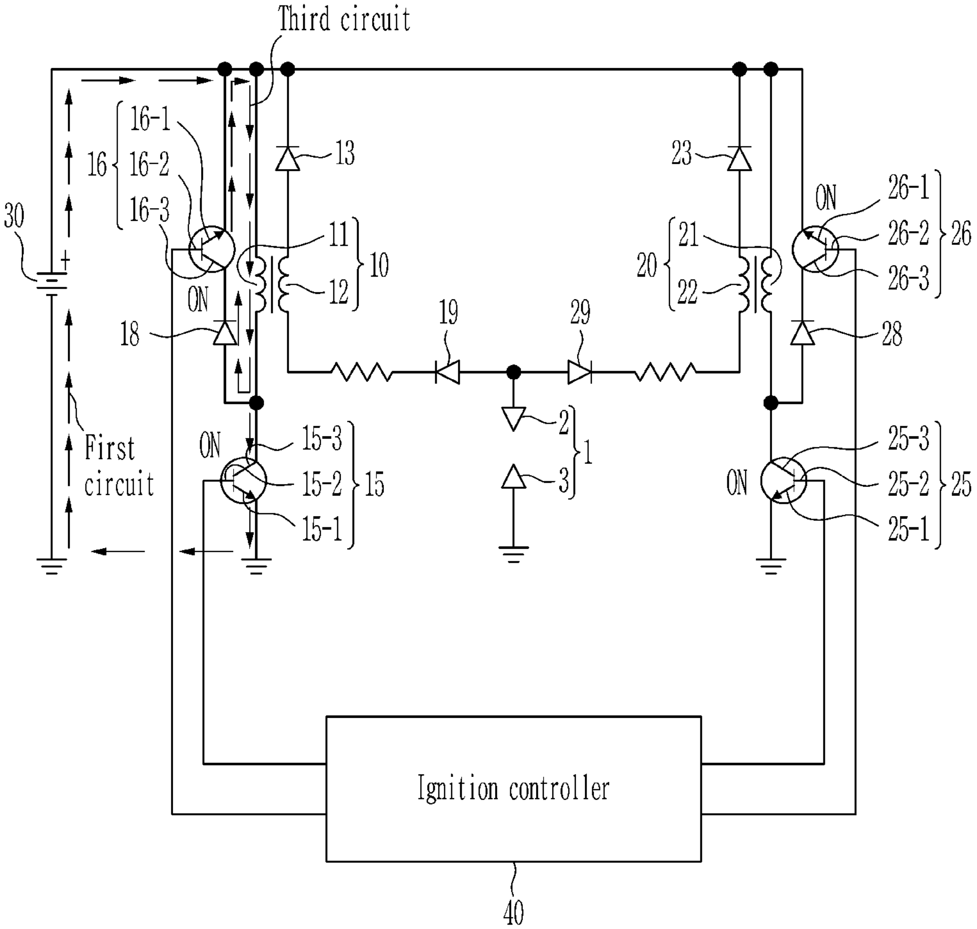

Referring to FIG. 6, in the second mode, the main switches 15 and 25 are turned on and the auxiliary switches 16 and 26 are also turned on, by the control signal of the controller 40. Accordingly, the first circuit forms a closed circuit, and the third circuit also forms a closed circuit. Although the first circuit and the third circuit form the closed circuit, since a potential difference is generated in the primary coils 11 and 21 as the first circuit forms the closed circuit, electrical energy is charged in the primary coils 11 and 21.

That is, while the main switches 15 and 25 are turned on by the controller 40 so that the first circuit forms the closed circuit, even if the second circuit forms the closed circuit, the primary coils 11 and 21 are charged by the current outputted from the battery 30.

Figure 7:
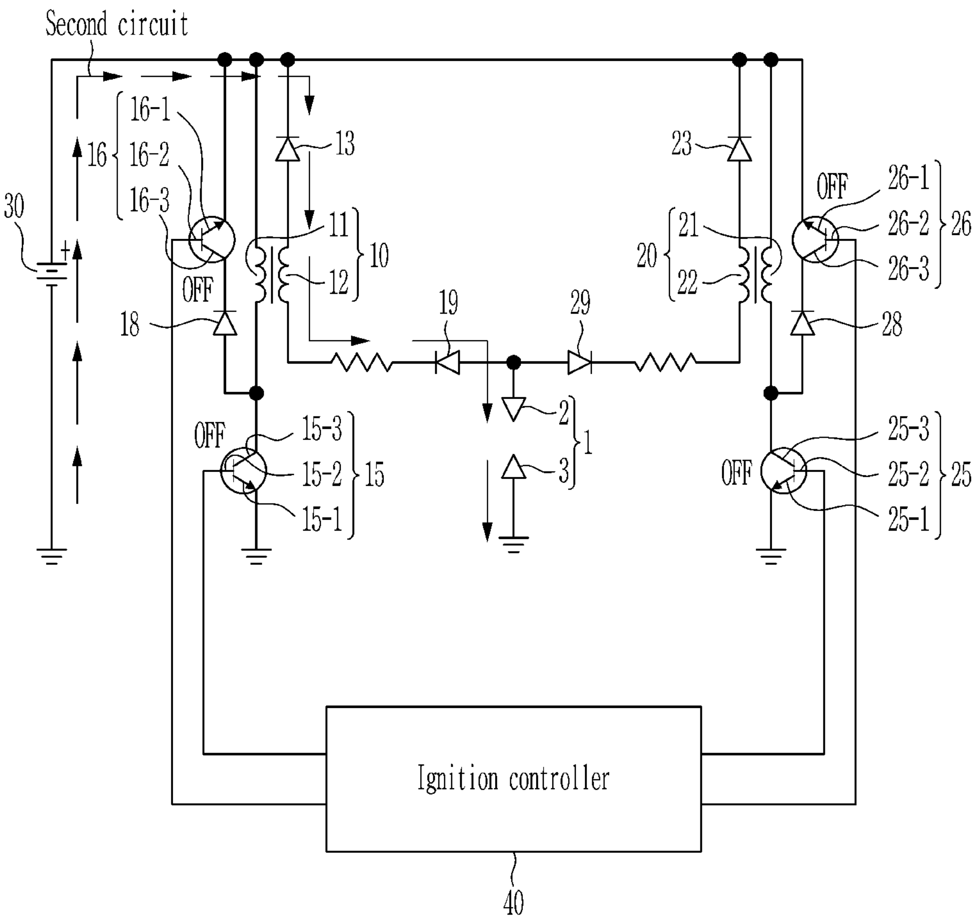

Referring to FIG. 7, in the third mode, the main switches 15 and 25 are turned off, while the auxiliary switches 16 and 26 are turned off by the control signal of the controller 40. Accordingly, a high-voltage discharge current is induced in the secondary coils 12 and 22 by the electromagnetic induction of the primary coils 11 and 21 and the secondary coils 12 and 22. The high-voltage discharge current induced in the secondary coils 12 and 22 is supplied to the center electrode 2 and the ground electrode 3, so that spark discharge occurs between the center electrode 2 and the ground electrode 3. The third mode may be a discharging mode of the ignition coil.

That is, when no control signal is applied to the main switches 15 and 25 and the auxiliary switches 16 and 26, the first circuit forms an open circuit, and while the high-voltage current induced in the secondary coils 12 and 22 is applied to the center electrode 2 along the second circuit, a spark discharge is generated between the center electrode 2 and the ground electrode 3.

Figure 8:
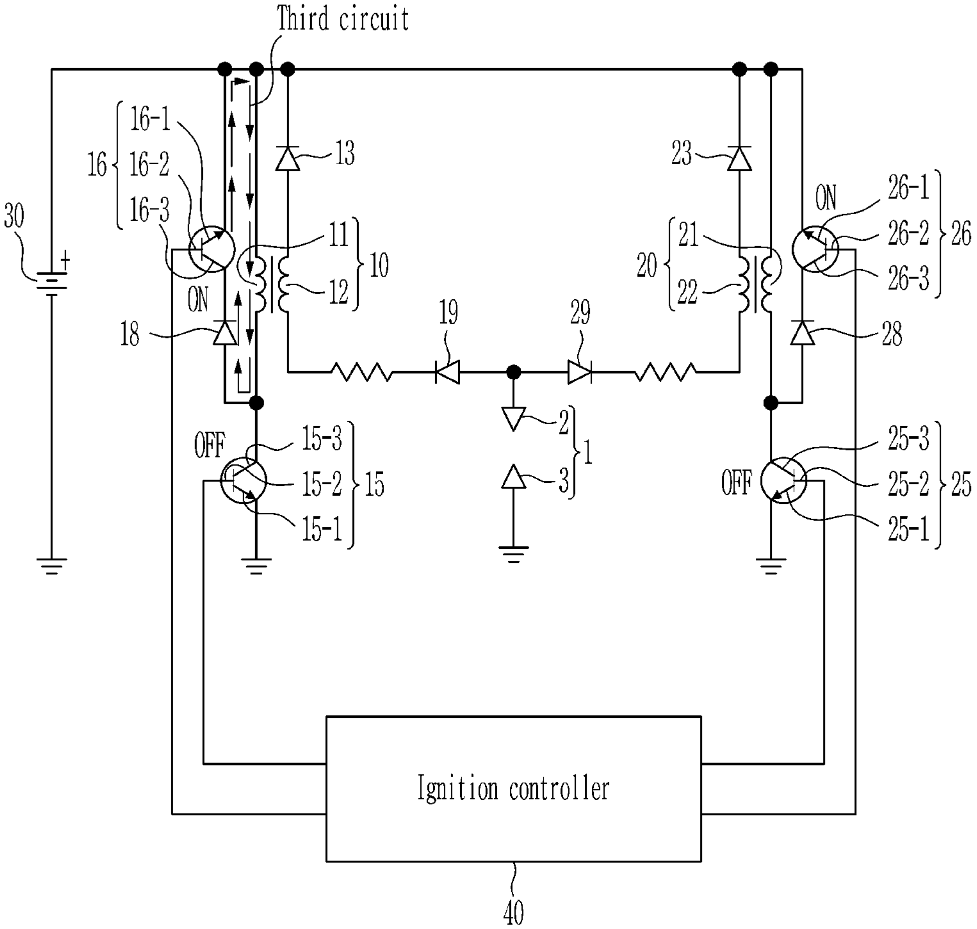

Referring to FIG. 8, in the fourth mode, the main switches 15 and 25 are turned off, while the auxiliary switches 16 and 26 are turned on, by the control signal of the controller 40. Accordingly, the induced current is no longer discharged in the secondary coils 12 and 22. The fourth mode may be a neutral mode that temporarily stops the discharging of the ignition coils 10 and 20.

That is, while the first circuit forms an open circuit (in other words, while the secondary coils 12 and 22 are discharged), when a control signal is applied to the base terminals 16-2 and 26-2 of the auxiliary switches 16 and 26 by the controller 40, the third circuit forms a closed circuit. In this case, when the third circuit forms the closed circuit, the electrical energy charged in the primary coils 11 and 21 flows along the third circuit, and the voltage applied to the secondary coils 12 and 22 is considerably reduced. Accordingly, the discharge in the secondary coils 12 and 22 is temporarily stopped.

Meanwhile, an ignition apparatus according to an embodiment may selectively perform the multi-stage ignition that generates the spark discharge at the spark plug 1 through the two ignition coils 10 and 20 based on the operation region of the engine, or the single-stage ignition that generates the spark discharge at the spark plug 1 through one ignition coil among the two ignition coils 10 and 20.

The multi-stage ignition means generating the spark discharge between the center electrode 2 and the ground electrode 3 of the spark plug 1 by using the two ignition coils (the first ignition coil and the second ignition coil), and the single-stage ignition means generating the spark discharge between the center electrode 2 and the ground electrode 3 of the spark plug 1 by using one ignition coil among the two ignition coils (first ignition coil and second ignition coil).

Figure 9:
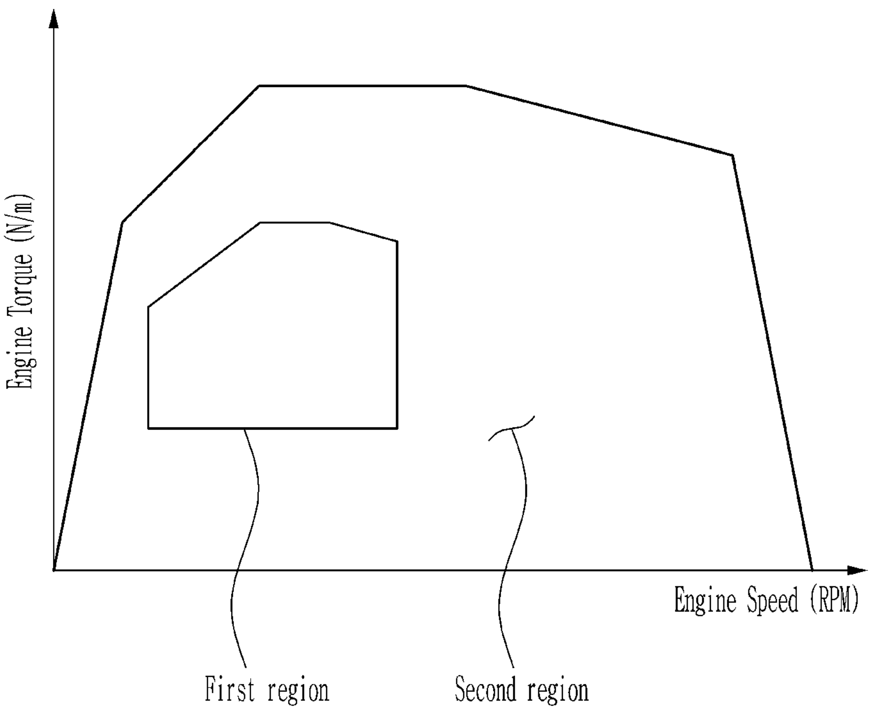
FIG. 9 is a graph illustrating an example of an operation region of an engine.

Referring to FIG. 9, in some implementations, the operation region of the engine may include a first region and a second region.

The first region may mean an operation region of the engine in which the recirculation gas (EGR gas) is supplied to the cylinder of the engine through the exhaust gas recirculation apparatus, or the combustion leaner than the theoretical air/fuel ratio is performed. In other words, the first region may be a region in which the EGR gas is used, or a region in which a lean combustion is performed.

In the first region, the EGR gas flows into the combustion chamber, or the lean combustion is performed, and therefore, ignitability of the air-fuel mixture may be enhanced by performing the multi-stage ignition to supply a sufficient ignition energy to the air-fuel mixture (i.e., fuel plus air) within cylinder.

The second region may mean a remaining operation region excluding the first region. In the second region, the ignitability of the air-fuel mixture does not matter, and therefore, the single-stage ignition may be performed to prevent unnecessary power consumption.

In an ignition apparatus according to an embodiment, when performing the multi-stage ignition in the operation region (e.g., the first region) in which the lean combustion of the engine is performed, the charging speed of the ignition coil, the number of discharges and the discharge maintaining period may be adjusted according to the driving point of the engine.

When the driving point of the engine 120 moves from a low-load to a high-load, the flow within the combustion chamber 101 increases due to the increase of the load, and the flow between the center electrode 2 and the ground electrode 3 of the spark plug 1 also increases. Accordingly, resistance of a secondary circuit forming the secondary coils 12 and 22 of the ignition coils 10 and 20 increases, and the discharging speed increases. Therefore, as the driving point of the engine 120 goes from the low-load to the high-load, more charging time is required.

In order to solve this, when the multi-stage ignition is performed, the charging speed of the ignition coils 10 and 20 is increased as the driving point of the engine 120 goes from the low-load to the high-load. The method for adjusting the charging speed of the ignition coils 10 and 20 is later described in detail.

In addition, even if the engine speed changes, the same ignition energy should be supplied to the combustion chamber 101 in order to constantly maintain an internal condition of the combustion chamber 101. Therefore, the number of discharges and the discharge maintaining period of the secondary coils 12 and 22 of the ignition coils 10 and 20 need to be adjusted, as the driving point of the engine goes from a low-speed to a high-speed.

When the engine speed is the high-speed, an initial discharge current may be relatively increased, the discharge maintaining period may be decreased, and the number of discharges may be decrease. When the engine speed is the high-speed, in the case that the discharge maintaining period of the ignition coils 10 and 20 is increased, ineffective discharge generated after the top dead center may occur. Therefore, when the engine speed is the high-speed, the initial discharge current may be relatively increased, and the discharge maintaining period may be decreased. Here, the initial discharge current may be increased by increasing a main charging period for which the primary coils 11 and 21 are initially charged. In addition, the discharge maintaining period means a period for which an ignition channel is maintained, that is, a period from an initial discharge time point a time point until which the discharge is maintained. The discharge maintaining period may be achieved by increasing the number of discharges or by increasing an auxiliary charging period.

To the contrary, when the engine speed is the low-speed, the initial discharge current may be relatively decreased, the discharge maintaining period may be increased, and the number of discharges may be increased. When the engine speed is low, the possibility of generating the ineffective discharge is very low even if the discharge maintaining period is increased, and therefore, sufficient ignition energy may be supplied into the combustion chamber 101 by increasing the discharge maintaining period and the number of discharges.

Figure 10:
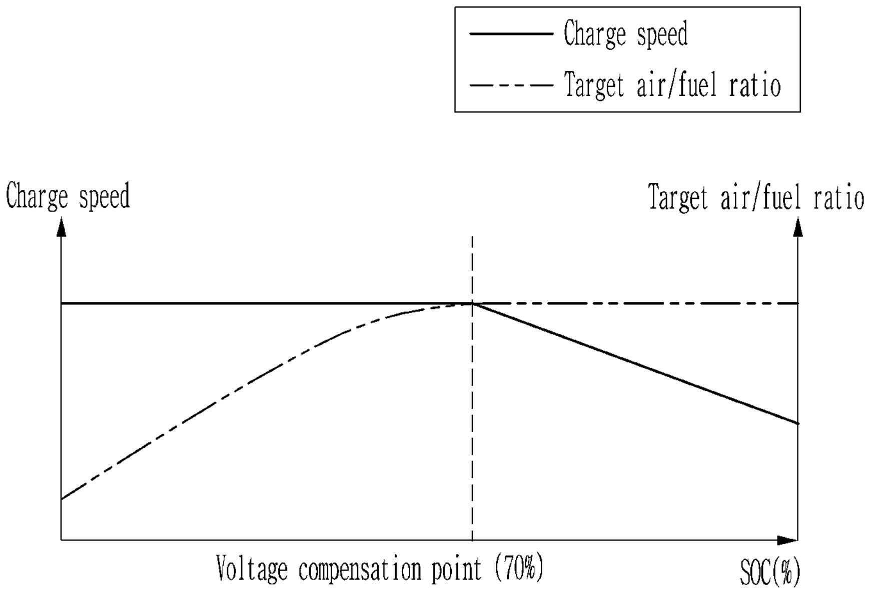
FIG. 10 is a graph illustrating an example of a charging speed and a target air/fuel ratio depending on an SOC of a battery.

In an ignition apparatus according to an embodiment, when performing the multi-stage ignition in the operation region (e.g., the first region) in which the lean combustion of the engine is performed, the charging speed and a lean limit (or the target air/fuel ratio) of the ignition coil system at the time of performing the lean combustion may be controlled based on the state of charge (the SOC) of the battery 30 (refer to FIG. 10).

A voltage supplied to the primary coils 11 and 21 of the ignition coils 10 and 20 may change according to the SOC of the battery 30. Because the charging speed of the primary coils 11 and 21 changes according to the level of the voltage supplied to the primary coils 11 and 21, the charging speed of the primary coils 11 and 21 is controlled according to the SOC of the battery 30, In order to constantly maintain the state of charge of the primary coils 11 and 21.

Referring to FIG. 10, when the SOC of the battery 30 is above a voltage compensation point (e.g., 70%), at the time of the multi-stage ignition, the controller 40 adjusts the charging speed of the ignition coils 10 and 20 according to the SOC of the battery 30.

In more detail, when the SOC is above the voltage compensation point, the controller 40 decreases the charging speed of the ignition coils 10 and 20 as the SOC of the battery 30 increases. When the SOC of the battery 30 is larger than the voltage compensation point, the voltage supplied from the battery 30 to the primary coils 11 and 21 of the ignition coils 10 and 20 increases as the SOC increases, and thereby, overcharging of the primary coils 11 and 21 may occur. Therefore, when the SOC of the battery 30 is larger than the voltage compensation point, the charging speed of the primary coils 11 and 21 of the ignition coils 10 and 20 is decreased as the SOC increases, and the charging speed of the primary coils 11 and 21 of the ignition coils 10 and 20 is increased as the SOC decreases. As such, by controlling the charging speed of the primary coils 11 and 21 according to the SOC, the state of charge may be uniformly controlled.

When the SOC of the battery 30 is below the voltage compensation point (e.g., 70%), the voltage supplied from the battery 30 to the primary coils 11 and 21 is excessively small, and thus, sufficient ignition energy may not be generated. Therefore, in such a case, when the lean combustion is performed, the lean limit (or, the target air/fuel ratio) is decreased (refer to FIG. 10). For example, supposing that the lean limit (or, the target air/fuel ratio) at the time when the SOC of the battery 30 is above the voltage compensation point (e.g., 70%) is 2, the lean limit (or, the target air/fuel ratio) at the time when the SOC of the battery 30 is below the voltage compensation point may be decreased as the SOC of the battery decreases.

Hereinafter, the method for controlling the charging speed of the ignition coil is described in detail.

The charging speed of the primary coils 11 and 21 of the ignition coils 10 and 20 may be controlled by the following two methods.

In the first method, ON-state of the auxiliary switch is maintained during the main charging period in which the primary coils 11 and 21 are initially charged and the auxiliary charging period after the main charging period, and a charging pulse width of the main switch is adjusted to control the charging speed of the primary coils 11 and 21.

Figure 11A:
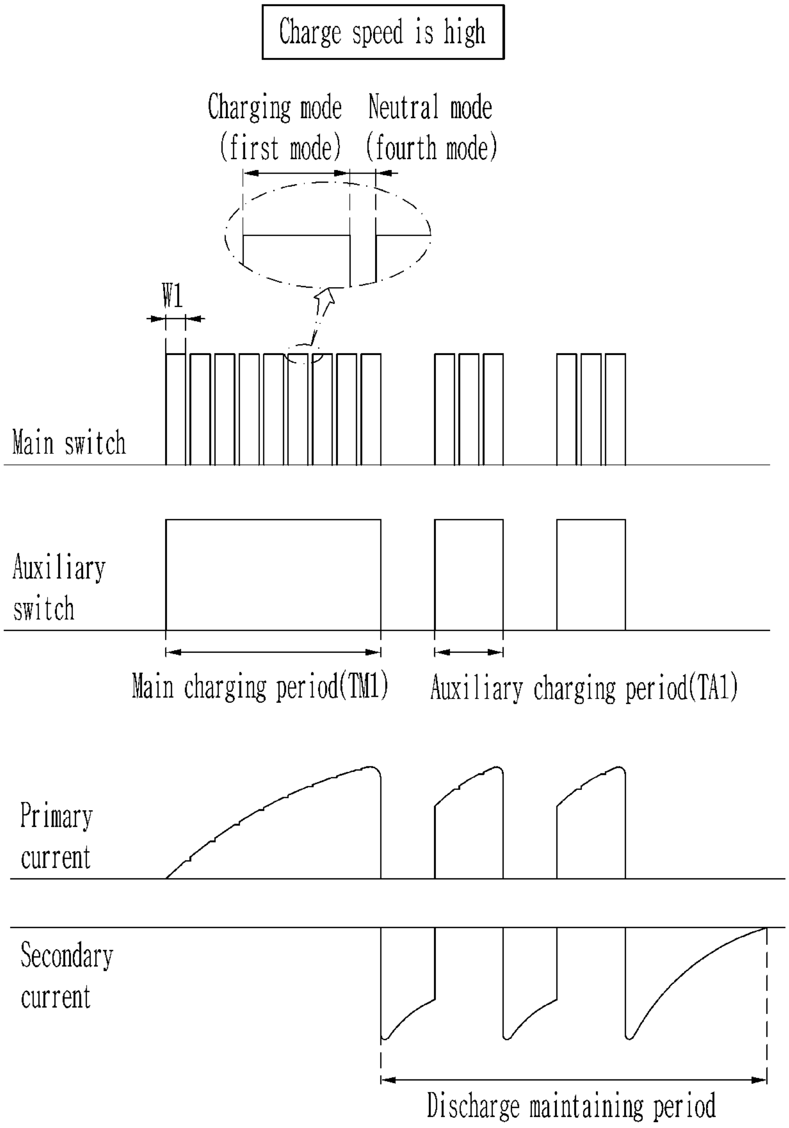
FIG. 11A and FIG. 11B are diagrams illustrating an example of a control signal of a main switch and an auxiliary switch for charging a primary coil of an ignition coil.
Figure 11B:
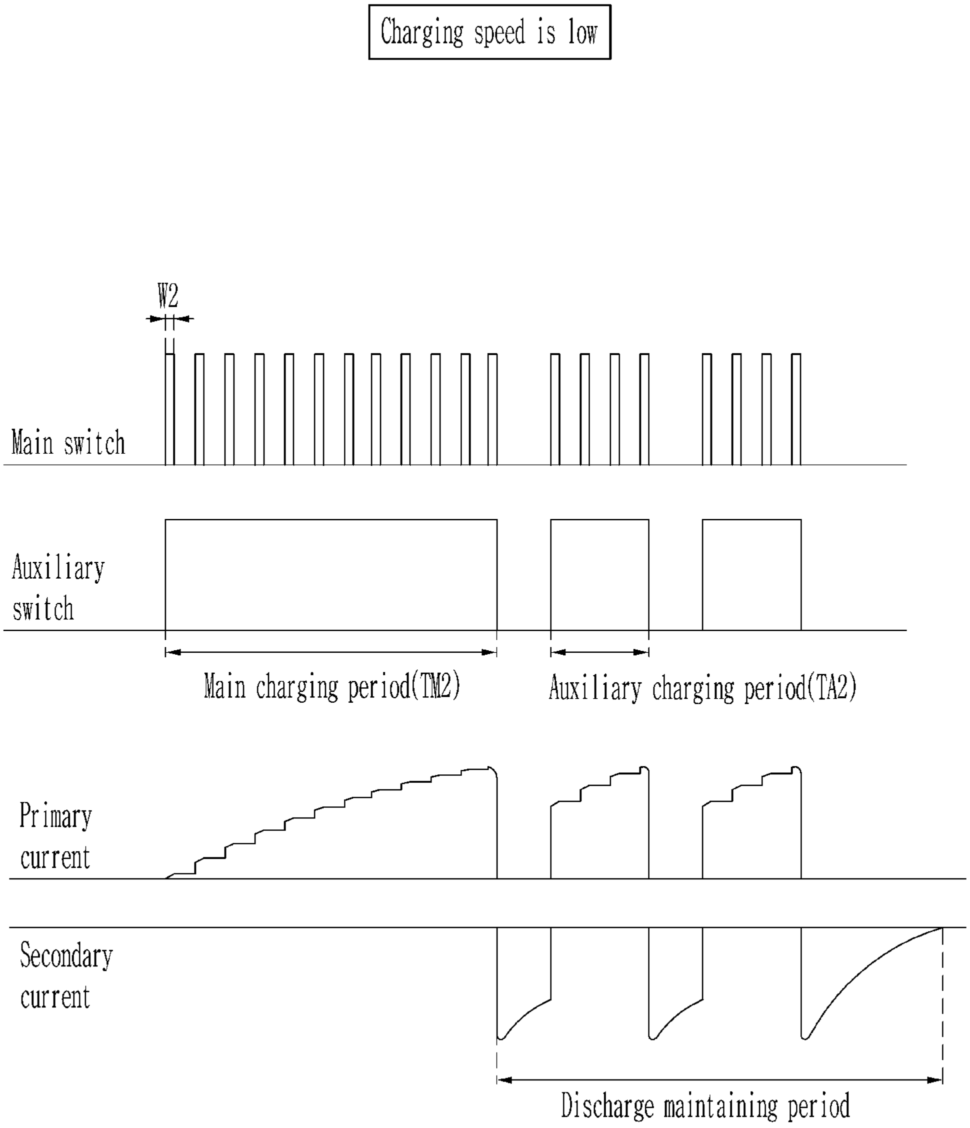

FIG. 11A and FIG. 11B are drawings showing a control signal of a main switch and the auxiliary switch for charging a primary coil of an ignition coil. In FIG. 11A and FIG. 11B, the leftmost side pulse is the main charging period, and the pulse subsequent to the main charging period is the auxiliary charging period.

Referring to FIG. 11A, the auxiliary switch 16 is maintained to the ON-state during the main charging period, and the charging speed of the primary coils 11 and 21 may be increased by increasing a width w1 of the charging pulse of the main switch 15. Accordingly, the main charging period TM1 and the auxiliary charging period TA1 are decreased (shortened).

Referring to FIG. 11B, during the main charging period (or, while the auxiliary switched ON), the charging speed of the primary coils 11 and 21 may be decreased by decreasing a width w2 of the charging pulse of the main switch 15. Accordingly, the main charging period TM2 and the auxiliary charging period TA2 are increased (elongated).

In other words, the first method that controls the charging speed of the primary coils 11 and 21 of the ignition coil may be realized by adjusting transition period of the first mode (or, the second mode) and the fourth mode through the on/off control of the main switch 15 and the auxiliary switch 16 during the main charging period and the auxiliary charging period.

As described above, the first mode (or, the second mode) is the charging mode of the ignition coil, and the fourth mode is the neutral mode for temporarily stopping charging of the ignition coil. Therefore, when the period for maintaining the first mode (or, the second mode) during the main charging period and the auxiliary charging period is increased, the charging speed of the ignition coil is increased. To the contrary, when the period for maintaining the first mode (or, the second mode) is decreased, the charging speed of the ignition coil is also decreased.

The second method is a method that controls the charging speed of the primary coils 11 and 21 of the ignition coil by adjusting the period of maintaining the neutral mode in which the charging of the primary coils 11 and 12 is temporarily stopped during the auxiliary charging period (or, the period of maintaining the fourth mode).

Figure 12A:
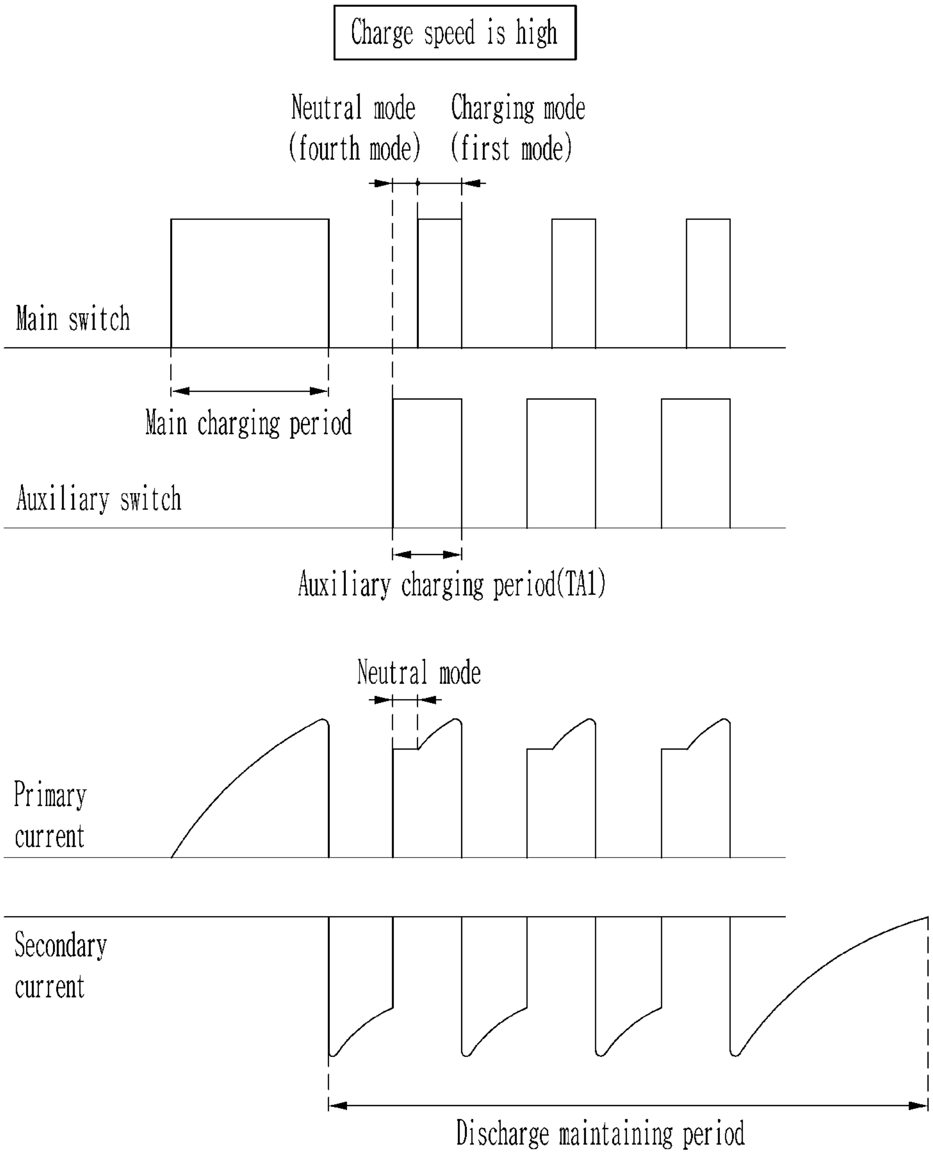
FIG. 12A and FIG. 12B are diagrams illustrating another example of a control signal of a main switch and an auxiliary switch for charging a primary coil.
Figure 12B:
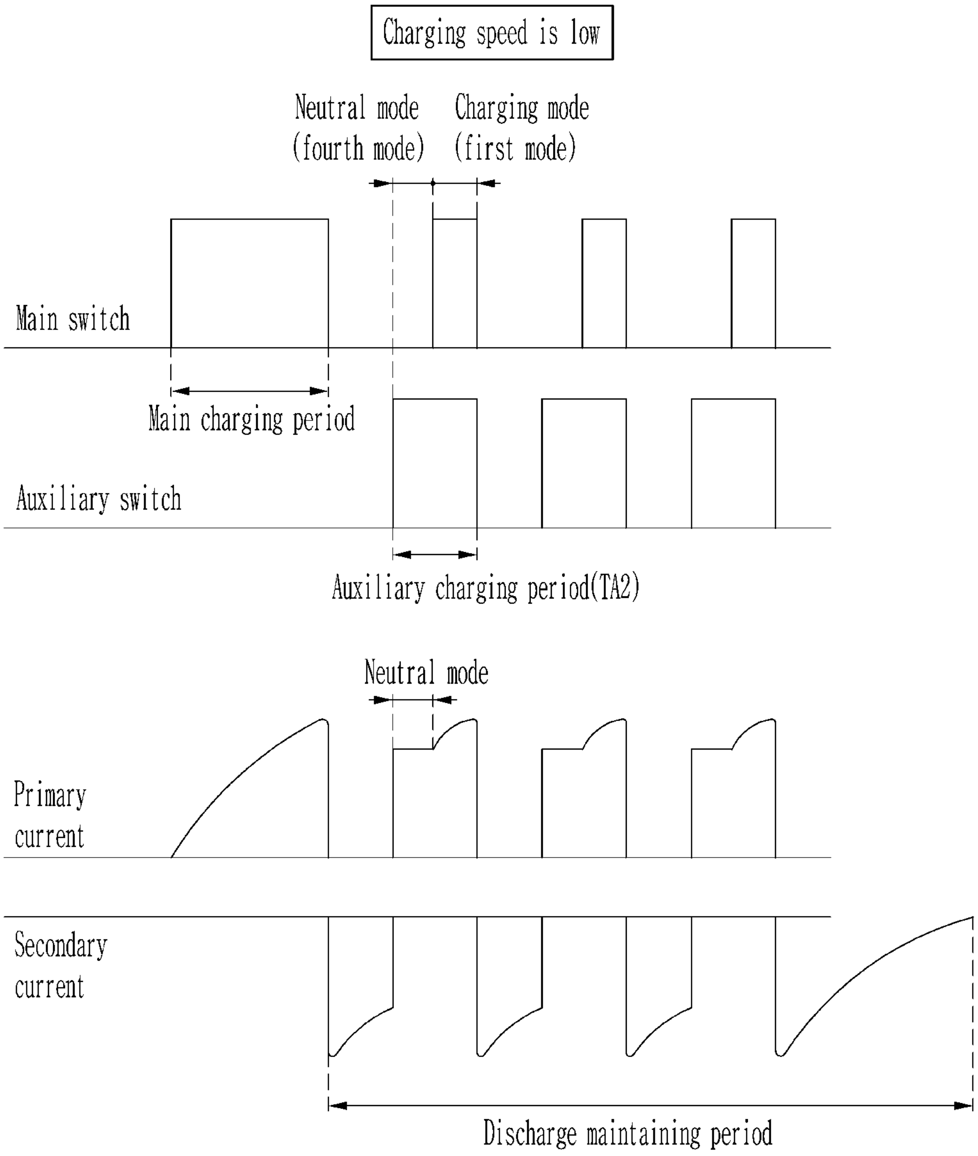

FIG. 12A and FIG. 12B are other drawings showing a control signal of a main switch and the auxiliary switch for charging a primary coil. In FIG. 12A and FIG. 12B, the leftmost pulse is the main charging period, and the pulse subsequent to the main charging period is the auxiliary charging period. Here, the auxiliary charging period may be provided in a plural quantity.

Referring to FIG. 12A, by decreasing the period for maintaining the neutral mode where the charging is temporarily stopped in the auxiliary charging period after the main charging period, the charging speed of the primary coils 11 and 21 of the may be controlled relatively rapidly. Therefore, the auxiliary charging period TA1 is shortened.

Referring to FIG. 12B, by increasing the period for maintaining the neutral mode where the charging is temporarily stopped in the auxiliary charging period after the main charging period, the charging speed of the primary coils 11 and 21 of the ignition coil may be controlled relatively slowly. Therefore, the auxiliary charging period TA2 may be lengthened.

In other words, the second method that controls the charging speed of the primary coils 11 and 21 of the ignition coil may be adjusting the transition period of the first mode (or, the second mode) and the fourth mode by the on/off control of the main switch 15 and the auxiliary switch 16 during the auxiliary charging period.

As described above, the first mode (or, the second mode) is the charging mode of the ignition coil, and the fourth mode is the neutral mode for temporarily stopping the charging of the ignition coil. Therefore, when the period for maintaining the fourth mode during the auxiliary charging period (the period for maintaining the neutral mode) is decreased, the charging speed of the ignition coil is increased. To the contrary, when the period for maintaining the fourth mode during the auxiliary charging period (the period for maintaining the neutral mode) is increased, the charging speed of the ignition coil is decreased.

Hereinafter, an operation of an ignition apparatus is described in detail with reference to the drawings.

Figure 13:
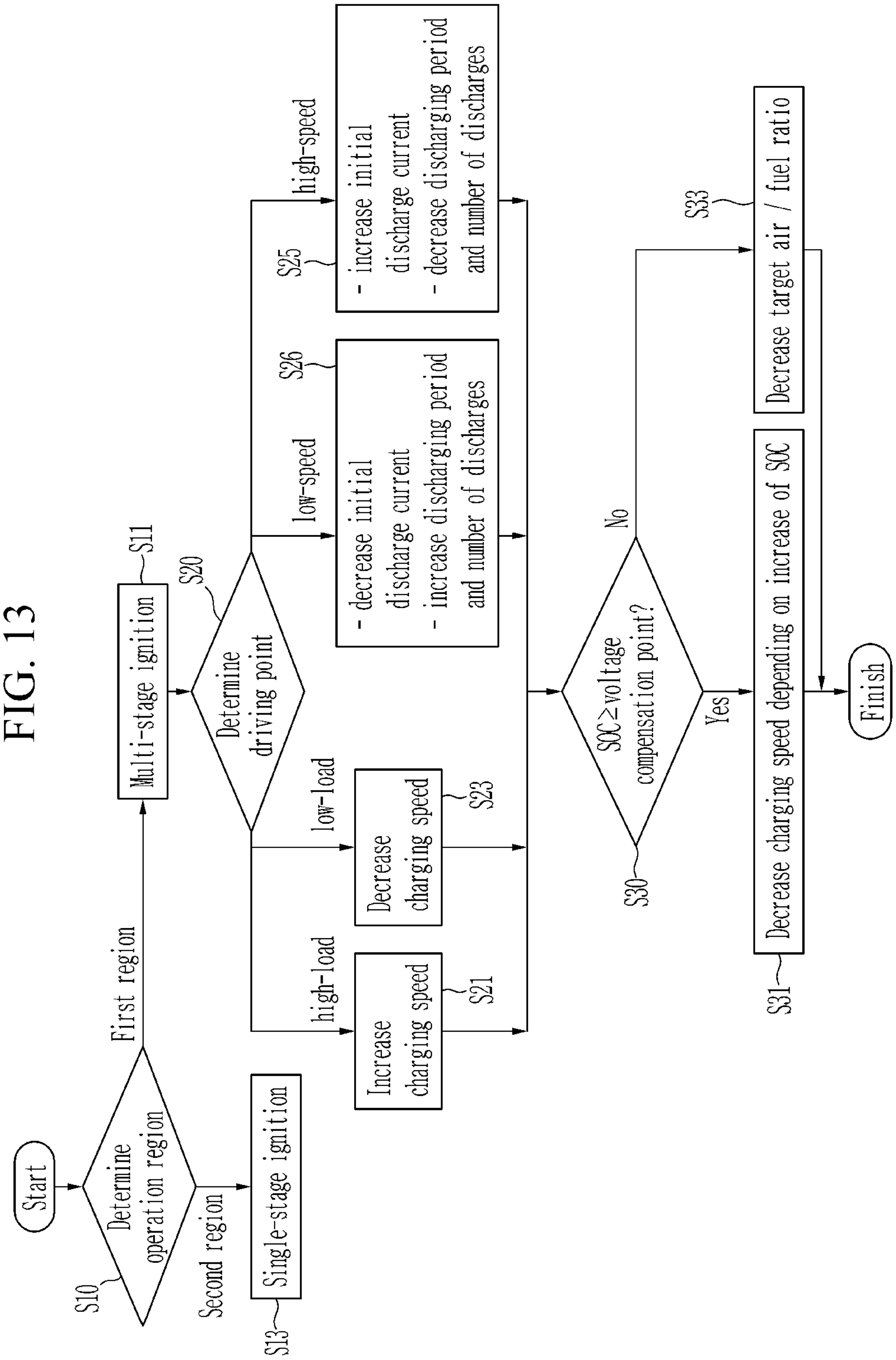
FIG. 13 is a flowchart describing an example of a control method of an ignition apparatus.

FIG. 13 is a flowchart showing a control method of an ignition apparatus.

As shown in FIG. 13, at step S10, the controller 40 determines the operation region of the engine according to the engine speed and the engine load, to selectively perform the single-stage ignition or the multi-stage ignition depending on the operation region of the engine.

At step S11, when the operation region of the engine is the first region performing the lean combustion, the controller 40 performs the multi-stage ignition.

At step S13, when the operation region of the engine is the second region other than the first region performing the lean combustion, the controller 40 performs the single-stage ignition.

At step S20, the controller 40 determines the driving point of the engine 120 in the operation region performing the lean combustion (or, when the multi-stage ignition is performed), and controls the charging speed, the number of discharges and the discharge maintaining period of the primary coils 11 and 21 of the ignition coils 10 and 20, according to the driving point of the engine 120.

At step S21, when the engine load is the high-load, the controller 40 increases the charging speed of the primary coils 11 and 21 of the ignition coils 10 and 20. To the contrary, at step S23, when the engine load is the low-load, the controller 40 decreases the charging speed of the primary coils 11 and 21 of the ignition coils 10 and 20.

The method for adjusting the charging speed of the ignition coil is described above, and is not described here again.

At step S25, when the engine speed is the high-speed, the controller 40 increases the initial discharge current, and decreases the discharge maintaining period and the number of discharges. To the contrary, at step S27, when the engine speed is the low-speed, the controller 40 decreases the initial discharge current, and increases the discharge maintaining period and the number of discharges.

At step S30, when the lean combustion is performed, (or when, the multi-stage ignition is performed), the controller 40 determines the SOC of the battery 30, and controls the charging speed, and the lean limit (or, the target air/fuel ratio) of the primary coils 11 and 21 of the ignition coils 10 and 20 according to the SOC.

At step S31, when the SOC of the battery 30 is above the voltage compensation point (e.g., 70), the controller 40 decreases the charging speed of the primary coils 11 and 21 as the SOC increases.

At step S33, when the SOC of the battery 30 is below the voltage compensation point, the controller 40 decreases the lean limit (or, the target air/fuel ratio) at the time of performing the lean combustion.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. An ignition apparatus of an engine, comprising:

a spark plug disposed in a combustion chamber of the engine and configured to generate a spark discharge between a center electrode and a ground electrode;

a plurality of ignition coils each configured to apply a current to the spark plug and comprising a primary coil, a secondary coil, a main switch configured to selectively provide current to the primary coil, and an auxiliary switch connected in parallel to the primary coil; and a controller configured to:

based on an operation region of the engine, selectively perform (i) a multi-stage ignition through a first ignition coil and a second ignition coil among the plurality of ignition coils or (ii) a single-stage ignition through one ignition coil among the first ignition coil and the second ignition coil, based on a driving point of the engine, adjust a charging speed, a number of discharges, and a discharge maintaining period of the ignition coil that is selected to perform the ignition, and adjust the charging speed of the ignition coil and a target air/fuel ratio to perform lean combustion based on a state of charge (SOC) of a battery.

2. The ignition apparatus of claim 1, wherein each of the plurality of ignition coils comprises:

a first circuit in which the battery, the primary coil, and the main switch selectively provide a closed circuit, a second circuit in which the secondary coil, the center electrode, and the ground electrode selectively provide a closed circuit, and a third circuit in which the primary coil and the auxiliary switch selectively provide a closed circuit.

3. The ignition apparatus of claim 2, wherein the controller is configured to selectively perform a plurality of modes, the plurality of modes comprising:

a first mode in which the first circuit forms a closed circuit by an operation of the main switch and the auxiliary switch to charge the primary coil, a second mode in which the first circuit and the second circuit form a closed circuit by the operation of the main switch and the auxiliary switch to charge the primary coil, a third mode in which the third circuit forms an open circuit by the operation of the main switch and the auxiliary switch to discharge the secondary coil, and a fourth mode in which the discharge of the secondary coil is temporarily stopped by the operation of the main switch and the auxiliary switch.

4. The ignition apparatus of claim 1, wherein the controller is configured to:

based on an operation region being a region performing lean combustion, perform the multi-stage ignition, and based on the operation region not being the region performing lean combustion, perform the single-stage ignition.

5. The ignition apparatus of claim 4, wherein the controller is configured to, in the operation region performing lean combustion, based on the driving point of the engine being moved from low-load to high-load, increase the charging speed of the ignition coil.

6. The ignition apparatus of claim 4, wherein the controller is configured to, in the operation region performing lean combustion, based on the driving point of the engine being moved from low-speed to high-speed, increase an initial discharge current and decrease the discharge maintaining period and the number of discharges.

7. The ignition apparatus of claim 4, wherein the controller is configured to, in the operation region performing lean combustion, based on SOC of the battery being greater than a voltage compensation point, increase the charging speed of the ignition coil as the SOC increases.

8. The ignition apparatus of claim 7, wherein the controller is configured to, based on the SOC of the battery being less than the voltage compensation point, decrease the target air/fuel ratio for performing lean combustion.

9. A method for controlling an ignition apparatus, the method comprising:

determining, by a controller, an operation region of an engine;

selectively performing, based on the operation region of the engine, (i) a single-stage ignition by one of a plurality of ignition coils or (ii) a multi-stage ignition by the plurality of ignition coils, by the controller;

controlling, based on a driving point of the engine, a charging speed, a number of discharges, and a discharge maintaining period of the ignition coil that is selected to perform the ignition, by the controller; and controlling, based on a state of charge (SOC) of a battery, the charging speed and a target air/fuel ratio of the ignition coil, by the controller.

10. The method of claim 9, wherein:

based on the operation region of the engine being a region performing lean combustion, the multi-stage ignition is performed, and based on the operation region of the engine not being the region performing lean combustion, the single-stage ignition is performed.

11. The method of claim 10, wherein controlling the charging speed comprises increasing, in the operation region performing lean combustion, based on the driving point of the engine being moved from a low-load to a high-load, the charging speed of the ignition coil.

12. The method of claim 10, wherein controlling the discharge maintaining period and the number of discharges comprises, in the operation region performing lean combustion, based on the driving point of the engine being moved from a low-speed to a high-speed, increasing an initial discharge current of the ignition coil and decreasing the discharge maintaining period and the number of discharges.

13. The method of claim 10, wherein controlling the charging speed comprises increasing, in the operation region performing lean combustion, based on the SOC of the battery being greater than a voltage compensation point, the charging speed of the ignition coil the SOC increases.

14. The method of claim 13, wherein controlling the target air/fuel ratio comprises decreasing, in the operation region performing lean combustion, based on the SOC of the battery being less than the voltage compensation point, the target air/fuel ratio for performing lean combustion.

* * * * *